May 6, 1958   J. BUDNICK   2,833,569
SHEET METAL SPLIT GLAND RING FOR THREADLESS COUPLING
Filed April 21, 1953   2 Sheets-Sheet 1

INVENTOR
JOSEPH BUDNICK
BY
E. S. Lovette
ATTORNEY

May 6, 1958   J. BUDNICK   2,833,569
SHEET METAL SPLIT GLAND RING FOR THREADLESS COUPLING
Filed April 21, 1953   2 Sheets-Sheet 2
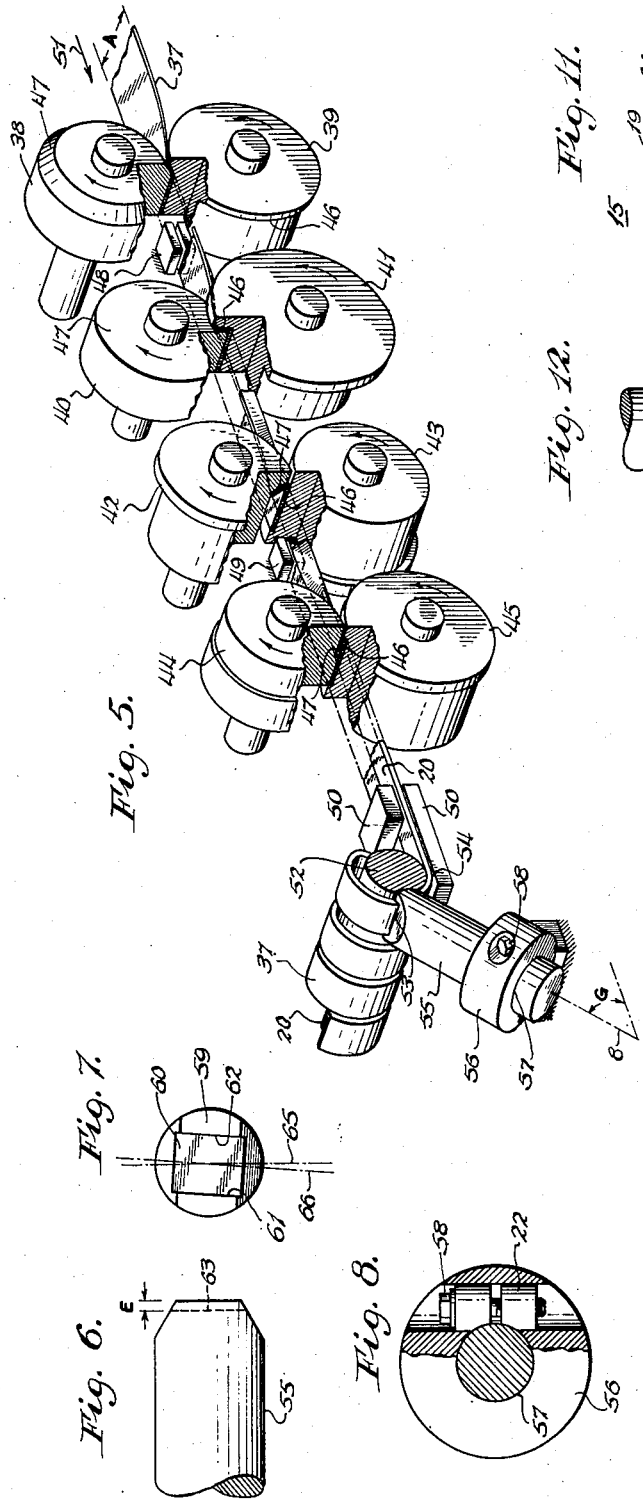
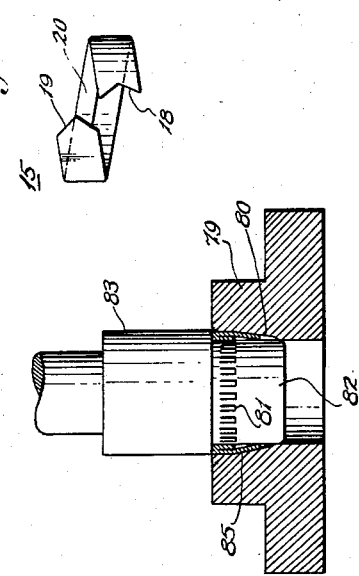
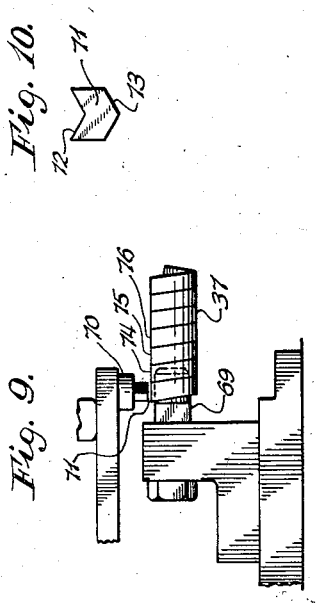
INVENTOR
JOSEPH BUDNICK
BY
E. S. Lovette
ATTORNEY

2,833,569
Patented May 6, 1958

2,833,569
SHEET METAL SPLIT GLAND RING FOR THREADLESS COUPLING

Joseph Budnick, New York, N. Y., assignor to Electrical Fittings Corporation, Woodside, N. Y., a corporation of New York Application April 21, 1953, Serial No. 350,100

2 Claims. (Cl. 285—389)

The present invention relates to an improved threadless coupler for electrical metallic tubing and rigid conduit, and more particularly relates to an improved gland ring therefor and a method of making same.

Expediency and economy very often require a threadless connection to rigid conduit, which conduit is used as a raceway for wires and cables in electrical insulations. The threadless connection is accomplished by a coupler consisting of a nut, a gland ring also known as a clamping band, and a connector. In operation, the conduit is inserted into the connector with the gland ring wedged between the encircled conduit and the engaging surfaces of nut and connector. Upon drawing up the nut on the connector, the ring is squeezed and clamps tightly about the conduit until the latter is firmly held to the connector. A properly designed threadless coupler provides a fast but easily detachable connection with the conduit. The other end of the connector is outfitted for a threaded connection or for another threadless connection as the circumstances dictate. Often the coupler is used as means of connecting two pipes of different sizes.

The gland ring structure is, in essence, a thin, split, tapered or curve-walled cylinder. In view of its simple shape and design, the ring, in comparison with the other components of the coupler, is unproportionately expensive to make. The prior art ring structure is made from a round solid bar of cold drawn steel stock. This material is comparatively expensive. The manufacturer incurs an added cost because most of the solid core of the round bar must be removed and is discarded as scrap in the process of making the ring. In other words, the manufacturer faces a twofold cost peculiar to the prior art method of fabrication. He pays a premium price for metal most of which he must discard at still further premium cost. Furthermore, the cost of this material substantially increases for increasing sizes of rings because the cross-sectional area of the round bar increases as the square of the radius.

In the manufacture of the prior art structure, the core of the cold drawn steel bar stock is machined out, for example, by screw machine, and the outside surface is shaped to a taper. The manufacture of the ring, even in its most economical form, i. e., mass production basis, requires a heavy investment, such as automatic screw machines with attending skilled labor to set or operate the equipment.

The present invention contemplates a method of fabrication that drastically reduces cost and shortens the time of manufacture and also provides an improved ring of sturdier mechanical structure having better clamping characteristics. The present invention proposes a gland ring made from a doubled-over coiled, ribbon like strip of steel cut and formed into rings. In an alternative method of fabrication, the doubled-over strip is cut and formed into rings without coiling.

Use of strip steel requires about an average of $\frac{1}{20}$ the amount of steel compared to the amount of solid bar stock used in accordance with the prior art fabrication. This results in an appreciable reduction in material cost. Strip steel does not require machining such as boring out a solid core or turning down its width to a proper dimension. The dimensions of the purchased strip steel fits the needs of the gland ring without machining. Accordingly, the cost of machinery and labor is also reduced appreciably. Furthermore, the instant invention permits the practice of mass production of rings by unskilled labor.

The improved design of the ring made in accordance with the instant invention reduces mechanical failures whereby the operating life of the ring equals that of the other components of the coupler. The springiness of the strip steel ring provides a threadless coupler having stronger clamping power and requires less force in clamping. In addition, the design provides a knurled clamping surface thus producing a firmer bite into the conduit. As a result, the rigidity of the connection is improved.

It is therefore an object of the present invention to provide an improved gland ring for a metallic tubing and/or rigid conduit threadless coupler.

It is a further object to provide a method of fabricating a gland ring affording appreciable reductions of labor, material and tooling costs and effort.

It is a further object to provide a novel gland ring of sturdier mechanical design.

A further object is to provide an improved threadless coupler having greater clamping power although requiring less force to clamp firmly to conduit.

A further object is to provide a novel gland ring having a doubled-over, knurled wall affording a more positive bite into conduit whereby a threadless connection of greater rigidity is produced.

A further object is to provide a novel gland ring for a threadless coupler fabricated from cold rolled strip steel by a simple, inexpensive method.

Further objects and advantages of the present invention will become apparent from the following specification and drawings in which:

Fig. 5 illustrates means for folding over the metallic strip from which the gland ring is made;

Fig. 6 is a longitudinal view of the coiling tool;

Fig. 7 illustrates the tool face;

Fig. 8 is a view partly in section of the tool holder;

Fig. 9 illustrates the cutting press;

Fig. 10 is a face view of the cutting face;

Fig. 11 is a view of a cut ring prior to forming in the forming press;

Fig. 12 is a view of the forming press;

Figure 1:
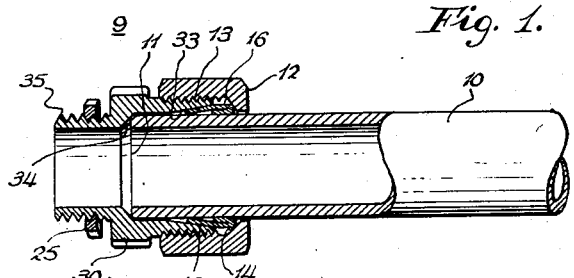
Fig. 1 is a longitudinal view partly in section of the improved threadless coupler.

The threadless coupler 9 is made up of a nut 12, a ring 15, and a connector 30. Conduit 10 has an end 11, at which end an unthreaded connection will be made. Nut 12 is provided with a threaded inside surface 13 and a beveled wall 14 at the rear of threaded surface 13. Cylindrically shaped connector 30 is provided with a threaded outside surface 31 for engagement with threaded surface 13 of nut 12. Connector 30 has an opening 32 adapted to receive end 11 of conduit 10. Inside surface 33 is tapered gradually at the mouth of opening 32 in a direction such that the diameter of opening 32 decreases with advancement into connector 30. A beveled surface 34 is provided at the rear of opening 32 and acts as a stop against which end 11 rests. For the purpose of illustration, the other end 35 of connector 30 is shown outfitted for a threaded coupling and has a washer 25.

Figure 2:
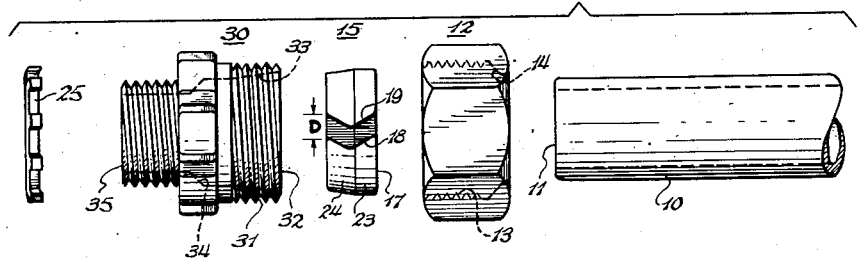
Fig. 2 illustrates the individual elements of the coupler shown in Fig. 1.
Figure 3:
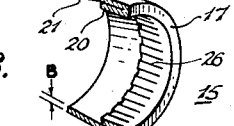
Fig. 3 is a perspective view partly in section of the improved gland ring.

Gland ring 15 has a side wall 16. The outside face of wall 16 is provided with a smooth finish to facilitate a sliding fit along surface 33. End 24 of ring 15 is tapered, at which end ring 15 is telescopically seated into the tapered mouth of opening 32. The other end 23 of ring 15 protrudes from connector 30 and terminates at a frontal edge 17 from which a folded-over margin 20 extends. Side wall 16 extends the full axial length of ring 15 and terminates at opposed frontal edges, one edge is identified as 17 in the figures while the other is unnumbered. The unnumbered edge, as will be seen hereinafter, is one of the longitudinal edges of a strip of material 37 from which ring 15 is formed and is the edge first inserted into coupler 9 for joining conduit 10 and serves to bite conduit 10 upon contraction of ring 15 by coupler 9 in a manner to be noted hereinafter. Margin 20 extends along inside face 21 of side wall 16. The inside exposed surface 26 of margin 20 is knurled and thereby provides a firm bite into conduit 10 to avoid slippage therebetween. Ring 15 extends circumferentially less than 360 degrees and terminates at ends 18 and 19. Ends 18, 19 have complementary shapes; in the illustrated embodiment of Fig. 2, ends 18, 19 are V's in the plane of side wall 16.

To assemble coupler 9 for operation, ring 15 is seated in the tapered mouth of opening 32. Nut 12 is threaded on connector 30, but is not tightened up until after conduit 10 is inserted into opening 32 with end 11 against stop 34. As nut 12 is tightened up by means of a wrench (not shown), it travels along threaded surface 31. This causes bevel face 14 to squeeze ring 15 and also to push laterally against edge 17. Thus, ring 15 is forced to advance deeper into opening 32 and at the same time it is squeezed until knurled face 26 makes a positive bite and firmly grips conduit 10.

The dimensions of opening 32, and of the reinforced portion of ring 15, i. e., that part of side wall 16 reinforced by the doubled-over margin 20, and the outside dimensions of ring 15 are chosen to permit easy and ready assemblage of coupler 9 and insertion of conduit 10 into the coupler. The present invention contemplates threading nut 12 along threaded surface 31 by hand until pressure is felt, after which a few turns with the aid of a wrench (not shown) firmly locks conduit 10 to coupler 9.

In the illustrated embodiment, coupler 9 has physical dimensions for use with a standard ½ inch rigid conduit, which conduit has an outside diameter of approximately .84 inch. Ring 15 is made of cold rolled steel stock, having a width A and thickness B, roughly 9/16 and .024 inch respectively. Width C of margin 20 is approximately 5/32 of an inch. The distance D between ends 18 and 19 is approximately 3/32 of an inch. Sufficient clearance should be allowed between ends 18, 19 so that ring 15 may be squeezed around conduit 10 without interference. The taper for opening 32 is roughly 10 degrees. Side wall 16 is tapered 7 degrees and edge 17 has a diameter approximately of .956 of an inch.

It should be clear that the dimensions set out above are illustrative. These dimensions, clearly, may vary for different size conduit or couplers.

In the manufacture of gland ring 15, the reinforced end 23 is formed by folding over margin 20 along the length of a long, continuous strip 37 of cold rolled steel. Strip 37 is passed between four pairs of pressure-forming, revolving rollers 38 to 45, inclusive, which rollers are power-geared to move strip in the direction of arrow 51. Faces 46, 47 of rollers 38 to 43, inclusive, are separated a distance approximately the thickness B of strip 37. Faces 46, 47 of the first pair of rollers 38, 39 are shaped to form a 45 degree advancement of margin 20 with respect to the plane of strip 37. The next two pairs of rollers 40, 41 and 42, 43 are each designed to effect successive 45 degree advancements of margin 20. The final stage of fold over is brought about by rollers 44, 45, the faces of which 46, 47 are spaced approximately twice the single thickness of the material to allow for the doubling over of margin 20. Guides 48, 49 and 50 serve to keep strip 37 in alignment with the rollers and to avoid buckling.

The strip 37 is then coiled in a form of a helix on a stationary, cylindrically shaped coiling arbor 52. The helix is formed by applying pressure against strip 37 at two points 53, 54 as strip 37 starts to wind about arbor 52. The flat face of guide 50 at point of tangency 54 establishes one pressure coiling point. Coiling tool 55 pressing against the moving strip 37 at point of tangency 53 establishes the second pressure coiling point.

Coiling tool 55 is held fast by a tool holder 56 having a clamping band 22 operated by clamping screw 58. Tool 55 fits into and extends through opening 57 of holder 56. Tool 55 may be withdrawn or advanced to a new position along opening 57 by unloosening clamping set screw 58, resetting tool 55, and then tightening screw 58. The longitudinal axis 8 of opening 57 and tool 55 projects at an angle G approximately 40 degrees from the horizontal. The face 59 of tool 55 has a right-angled groove 60 consisting of side and back walls 61, 62 and 63, respectively. The depth E and width of groove 60, the distance between side walls 61, 62, are slightly larger than the corresponding dimensions of the reinforced doubled over strip 37 to permit strip 37 to travel freely through groove 60. For the purpose of winding the coil in a helical form, groove 60 is oriented slightly askew with respect to vertical axis 65. In the illustrated embodiment, the axis 66 of groove 60 is inclined approximately 2 degrees from axis 65. The sense of orientation is counter-clockwise for a right-handed helix or clockwise for a left-handed helix.

Rollers 38 to 45 propel strip 37 with sufficient force to cause strip 37 to wind around arbor 52. As strip 37 travels through groove 60, it is twisted slightly; thereafter it travels along a helical curve as it winds about arbor 52. After the complete strip 37 is coiled, it is slipped off arbor 52 and inserted over an arbor 69 to be cut into rings by a cutting punch 70.

The face 71 of punch 70 has V-shaped cutting edges 72, 73. Edges 72, 73 are spaced apart distance D. Punch 70 is brought down to bear upon strip 37 at corresponding points, for example: 74, 75, 76, one revolution apart along the helix. The individual ring 15 cut from strip 37 by punch 70 is illustrated in Fig. 11.

Gland ring 15 is put under pressure for the purpose of aligning ends 18, 19 and forming to the desired contour. Ring 15 is seated in forming die 79. The seat 80 of forming die 79 is tapered for the purpose of shaping side wall 16 with a taper. A forming punch 83 has a cylindrically shaped center body 82. A series of embossments 81 encircle about and extend from the upper part of the cylindrical surface of body 82 for the purpose of knurling inside surface 26 of margin 20. The length of travel of punch 83 in its downward swing is controlled by conventional means not shown. Seat 80 is made sufficiently long to prevent the lower tapered end 24 of ring 15 from becoming crushed when punch 83 completes its full downward swing.

Thus, in one act of a power press, three steps may be carried out at the same time. Upon bearing down punch 83 upon edge 17 of ring 15 seated in die 79: (1) ends 18, 19 are forced into alignment, (2) side wall 16 is squeezed and thus shaped to a taper, and (3) inside face 26 of margin 20 is knurled.

In the illustrated embodiment, wall 85 of seat 80 has a 7 degree taper. The instant invention does not require that the taper of side wall 16 extend from upper edge 17 to the opposite lower edge. Accordingly, the portion of wall 85 of die 79 corresponding to the doubled-over reinforced part of side wall 16 is illustrated without a taper.

Figure 4:
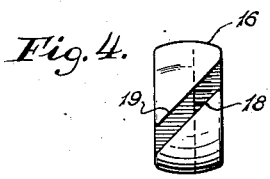
Fig. 4 is a modified embodiment of the gland ring.
Figure 13:
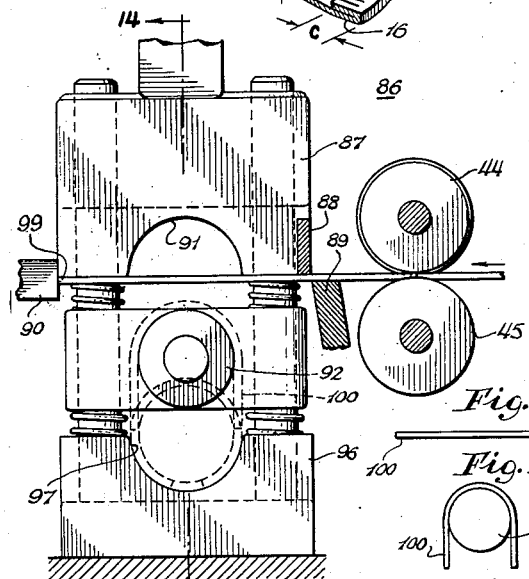
Fig. 13 is a view of the horizontal power press.
Figure 14:
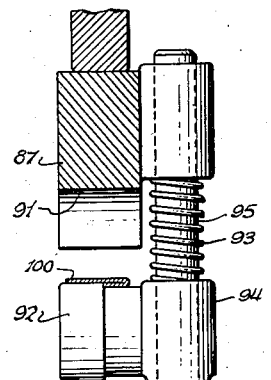
Fig. 14 is a side view of the horizontal power press.

Many changes could be made without departing from the scope of the present invention. For example, ends 18, 19 may have any convenient shape as determined by the contour of cutting edges 72, 73. Side wall 16 may be rounded rather than tapered as shown in Fig. 4. For this shape, the contour of wall 85 of forming die 79 is correspondingly changed to produce the rounded side wall 16. Furthermore, knurling of surface 26 may be done by pressure of forming rollers 44, 45 rather than at the forming press of Fig. 12. This would require that face 47 of roller 44 carry embossments 81. It is easy to visualize that aligning, tapering and knurling of ring 15 could be performed equally as well in separate successive steps rather than carrying these three acts out in one stroke as shown in Fig. 12. Furthermore, the knurling step may be omitted entirely although the illustrated embodiment includes knurling surface 26 because this ensures a firmer bite into conduit 10.

An alternative method of fabricating gland ring 15 contemplates doubling over margin 20 by pressure-forming rollers 38, 45 as illustrated in Fig. 5 after which strip 37 is cut and formed without being coiled into a helix.

Strip 37 is cut and formed by a horizontal power press 86. Press 86 consists of a movable upper forming die 87, a floating arbor 92 and a lower forming die 96. Upper forming die 87 has a shearing blade 88 and a semi-circular recess 91. Anvil 89 cooperates with blade 88 to cut strip 37. Floating arbor 92 is suspended between upper die 87 and lower die 96, by means of a compressing spring 93. Guide follower 94 extends from the rear of arbor 92 and engages guide 95. Stationary lower forming die has a semi-circular recess 97.

Figure 15A:
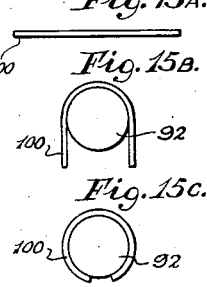
Figs. 15A–15C represent successive steps in a method of fabrication.

Strip 37 is fed into press 86 until advance end 99 abuts stop 90. Die 87 is powered downwardly whereby blade 88 cuts strip 37 as shown schematically in Fig. 15A. Stop 90 is located a predetermined distance from blade 88 so that the cut element 100 equals the circumferential length of ring 15. Blade 88 and anvil 89 may be set at an oblique angle to produce contoured ends 18, 19 as shown in Fig. 4.

Figure 15B:
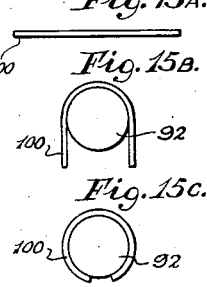
Figure 15C:
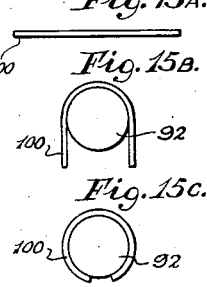

As die 87 continues its downward travel, element 100 is formed about arbor 92, as recess 91 engages the upper part of arbor 92 as shown schematically in Fig. 15B. Spring 93 is adjusted so that arbor 92 is carried downwardly by die 87 and engages recess 97. Thereupon element 100 is formed as illustrated schematically in Fig. 15C.

In the practice of the instant method of fabrication, surface 26 could be knurled by rollers 44, 45 prior to cutting and forming element 100. Surface 26 could be knurled equally as well after cutting and forming element 100 by means of forming die 79.

After forming element 100 into ring 15, the ring is referred to forming die 79 for the purpose of tapering or rounding side wall 16.

It will be understood that this alternative method may be readily modified by rolling the doubled-over strip 37 about a conventional stock reel as it comes off the rollers and then feeding the coiled strip to the press 86 from the reel. Whether the folded over strip 37 is fed to press 86 directly from the rollers as shown or from a reel is a matter of choice.

The number of pairs of pressure-forming rollers may be increased or decreased. The amounts of advancement brought about by each pair of rollers need not be equal to practice the instant invention. Furthermore, it is not necessary that strip 37 consist of cold rolled steel to practice the instant invention. It is contemplated, that any strip of material sufficiently strong to stand the wear a gland ring is subjected, may be used. Accordingly, it is intended that all matter in this specification and shown in the drawings shall be interpreted as illustrative and not in a limiting sense.

What is claimed is:

1. A split gland ring for a threadless coupler for joining a smooth ended conduit pipe by gripping same at such end upon contraction of said ring, said ring comprising, a section of rectangular ribbon of suitable material having spaced opposed longitudinal edges formed as a circular-shaped ring having a side wall with inner and outer surfaces, said wall extending the full axial length of said ring and terminating at opposed frontal edges wherein one of said longitudinal edges being a first of said frontal edges coextending along the periphery of said ring, the other longitudinal edge being doubled over to form a reinforcing margin extending axially from the other frontal edge but less than the entire axial length of said ring, said other longitudinal and frontal edges also coextending along the periphery of said ring, the outer surface of said margin bearing directly against said inner wall surface for the entire axial and circumferential dimension of said margin, the unreinforced portion of said wall being gradually tapered to define a smaller circumferential diameter at the unreinforced frontal edge, said ring being split in the plane of said wall from one frontal edge to the other and having closely spaced opposed ends to allow circumferential contraction of said ring, whereby the smooth end of said conduit pipe is firmly gripped by said ring as said unreinforced frontal edge circumferentially bites therein and as the inner surface of said margin circumferentially grips said pipe upon contraction of said ring.

2. A ring as defined in claim 1, wherein the inner surface of said margin is being knurled to effect a tight grip on said smooth pipe.

References Cited in the file of this patent

UNITED STATES PATENTS

| | | |
|---|---|---|
| 279,585 | Nugent | June 19, 1883 |
| 373,515 | Byrne | Nov. 22, 1887 |
| 730,093 | Chisholm | June 2, 1903 |
| 896,232 | McColl | Aug. 18, 1908 |
| 974,804 | McCabe | Nov. 8, 1910 |
| 1,574,052 | Mueller | Feb. 23, 1926 |
| 1,687,445 | Hazard | Oct. 9, 1928 |
| 2,126,473 | Keller | Aug. 9, 1938 |
| 2,187,880 | Kaysing | Jan. 23, 1940 |
| 2,251,717 | Parker | Aug. 5, 1941 |
| 2,255,673 | McDermott | Sept. 9, 1941 |
| 2,269,629 | Kreidel | Jan. 13, 1942 |
| 2,529,552 | Herold | Nov. 14, 1950 |
| 2,701,149 | Kreidel et al. | Feb. 1, 1955 |

FOREIGN PATENTS

| | | |
|---|---|---|
| 868,867 | France | Oct. 20, 1941 |
| 585,105 | Great Britain | Jan. 30, 1947 |